United States Patent [19]

Takata et al.

[11] Patent Number: 4,815,755
[45] Date of Patent: Mar. 28, 1989

[54] VEHICLE REAR SUSPENSION SYSTEM

[75] Inventors: Naoto Takata; Seita Kanai; Nobuhiro Araki; Tadashi Udo, all of Hiroshima, Japan

[73] Assignee: Mazda Motor Corporation, Hiroshima, Japan

[21] Appl. No.: 43,479

[22] Filed: Apr. 20, 1987

Related U.S. Application Data

[63] Continuation of Ser. No. 646,070, Aug. 31, 1984, abandoned.

[30] Foreign Application Priority Data

| Sep. 2, 1983 | [JP] | Japan | 58-161535 |
| Sep. 2, 1983 | [JP] | Japan | 58-161536 |
| Sep. 2, 1983 | [JP] | Japan | 58-161537 |
| Sep. 2, 1983 | [JP] | Japan | 58-161538 |
| Sep. 2, 1983 | [JP] | Japan | 58-161539 |
| Sep. 2, 1983 | [JP] | Japan | 58-161541 |
| Sep. 13, 1983 | [JP] | Japan | 58-168723 |

[51] Int. Cl.$^4$ .............................................. B60G 3/20
[52] U.S. Cl. ...................................... 280/690; 280/701
[58] Field of Search ................ 280/701, 690, 700, 698

[56] References Cited

U.S. PATENT DOCUMENTS

| 3,327,803 | 6/1967 | Cote et al. | 180/73 |
| 4,269,432 | 5/1981 | Inoue et al. | 280/690 |
| 4,440,419 | 4/1984 | Kosak et al. | 280/701 |
| 4,471,974 | 9/1984 | Kosak et al. | 280/701 |

FOREIGN PATENT DOCUMENTS

| 2038880 | 2/1972 | Fed. Rep. of Germany | 280/701 |
| 510335 | 5/1952 | Italy . | |
| 698921 | 12/1965 | Italy | 280/701 |
| 57-110513 | 7/1982 | Japan . | |

OTHER PUBLICATIONS

Jidosha Kogaku Zensho, vol. 11, Steering, Suspension, pp. 101-130, published Aug. 20, 1980.
Corvair, Chassis Shop Manual, pp. 4-1 and 4-24 through 4-32.
"Zur Analyse und Synthese räumlicher Einzelradaufhäungungen", by Dipl.-Ing. W. Matschinsky, ATZ 73, 1971, vol. 7, pp. 247-254.
Shinpen Jidosha Kogaku Binran (Fifth Version), published 11/26/82, pp. 4-1 through 4-3.
"Der Verschswagen C 111 von Daimler-Benz", by Dr.-Ing. Enke et al., ATZ 72, 1970, pp. 200-206, vol. 6.
"Suspension and Steering", by Donald Bastow, Automobile Engineer, May 8, 1970, pp. 217-230.
Automotive Industries, Sep. 15, 1961.

Primary Examiner—David M. Mitchell
Assistant Examiner—Ross Weaver
Attorney, Agent, or Firm—Fleit, Jacobson, Cohn & Price

[57] ABSTRACT

A vehicle rear suspension system having a vertically swingable arm connected at the front end swingably to the vehicle body and secured at the rear end to a wheel carrying member which carries a rear wheel for rotation. Three lateral links ar provided and have inward ends pivotably connected to the vehicle body and outward ends pivotably connected to the wheel carrying member. The points of connection of the three lateral links to the wheel carrying member are not aligned in a straight line so that the orientation of the wheel carrying member can appropriately be controlled under bump and rebouncing movements of the rear wheel and under side and longitudinal forces acting on the rear wheel.

29 Claims, 5 Drawing Sheets

VEHICLE REAR SUSPENSION SYSTEM

This is a continuation of application Ser. No. 646,070 filed Aug. 31, 1984 now abandoned.

The present invention relates to a vehicle suspension system and more particularly to a rear suspension system of a motor vehicle.

Conventional independent type vehicle rear suspension systems include a so-called trailing arm type and a semi-trailing arm type. These types of suspension systems include a trailing arm extending in a longitudinal direction of the vehicle body and having a front end attached to the vehicle body for vertical swinging movements, the trailing arm being secured at the rear end to a hub carrier which carries a rear wheel hub. A substantially vertically extending damping strut is provided between the rear end portion of the trailing arm and the vehicle body. The suspension systems of these types are advantageous in that they are simple in structure so that the overall weight can be decreased. It has, however, been recognized that the suspension systems of these types require trailing arm of substantial cross-sectional area in order to ensure an adequate lateral rigidity. Further, the front end of the trailing arm must be attached to the vehicle body at laterally spaced positions. As a result, the trailing arm must be of a substantial dimension and therefore of an increased weight.

In order to solve the above problems, Japanese laid-open utility model No. 56-62205 proposes, in a vehicle rear suspension system including a trailing arm having a front end mounted on a vehicle body for vertical swinging movements and a rear end carrying a wheel hub, to provide a pair of vertically spaced lateral links which are pivotably connected at the laterally outward ends to the rear end portions of the trailing arm and at the laterally inward ends to the vehicle body. This type of suspension system is advantageous in that the lateral links support the trailing arm so that the trailing arm may not be required to possess by itself a substantial lateral rigidity. It should however be noted that in this arrangement there are produced toe-out movements in the wheel when the wheel is bumped upwards with respect to the vehicle body and when the wheel is rebounced downwards with respect to the vehicle body. Such toe-out movements cause a tendency of over-steer in a curved path so that there will be a danger of steering instability.

It is therefore an object of the present invention to provide a vehicle rear suspension system which can provide improved stability of the vehicle.

Another object of the present invention is to provide a vehicle rear suspension system which can suppress toe-out movements of the wheel under vertical bumping movements.

A further object of the present invention is to provide a vehicle rear suspension system of a type including a substantially longitudinally extending swing arm for carrying a rear wheel and laterally extending links, which can suppress toe-out movements of the wheel under vertical bumping movements to thereby improve stability of the vehicle.

Still a further object of the present invention is to provide a vehicle rear suspension system in which axial forces applied to the lateral links can be minimized.

Yet a further object of the present invention is to provide a vehicle rear suspension system in which toe-in movements are produced in the rear wheel under braking forces.

A further object of the present invention is to provide a vehicle rear suspension system which can suppress toe-out movements of the rear wheel under vertical bumping movements and can produce desirable changes in toe-angles under side forces which are applied to the wheel when the vehicle is running through a curved path.

Still a further object of the present invention is to provide a vehicle rear suspension system which can desirably control both the camber angle and the toe-angle of the rear wheel.

Still a further object of the present invention is to provide a vehicle rear suspension system which can minimize the tread change in upward bouncing and downward rebouncing of the rear wheel.

According to the present invention, the above and other objects can be accomplished by a vehicle rear suspension system comprising swing arm means extending substantially longitudinally and having one end connected to a vehicle body for vertical swinging movements, wheel carrying means for carrying a rear wheel for rotation about a rotation axis, said wheel carrying means being connected with said swing arm means at the other end of the swing arm means so that a longitudinal force and a rotating force about a transverse axis extending in a lateral direction of the vehicle body can be transmitted between the swing arm means and the wheel carrying means, first, second and third lateral link means extending in substantially a lateral direction of the vehicle body, each of said lateral link means having one end pivotably connected with said wheel carrying means and the other end pivotably connected with the vehicle body, said one ends of the first, second and third lateral link means being connected to said wheel carrying means at locations which are not aligned on a single straight line.

According to the above arrangement of the present invention, the orientation of the wheel carrying means and therefore that of the rear wheel is determined only by the three lateral link means. Therefore, it becomes possible to control the toe-angle and the camber angle of the rear wheel in a desired manner under either or all of upward bumping and downward rebouncing of the rear wheel and side and longitudinal forces applied to the rear wheel by simply determining the arrangements of the lateral link means. For example, the inclination of each lateral link means in a horizontal plane and that in a vertical plane may appropriately be determined. In addition or alternatively, the lengths of the respective lateral link means, the positions of connections of the lateral link means to the wheel carrying means and the lateral rigidity of the connections between the lateral link means to the wheel carrying means may appropriately be determined to obtain desired results.

The swing arm means may simply possess strength and rigidity sufficient for transmitting longitudinal forces and rotating forces about a lateral axis. It is necessary that the swing arm means does not constrain the wheel carrying means so that the orientation of the wheel carrying means is controlled by the three lateral link means. For that purpose, the swing arm means may have low lateral rigidity so that the swing arm means is capable of deflecting in lateral directions under upward bouncing and downward rebouncing of the rear wheel. Alternatively, the swing arm means may be connected with the wheel carrying means so that a rotation about a vertical axis or a lateral relative displacement is permitted.

In one mode of the present invention, one of the lateral link means is connected to the wheel carrying means at a position higher than positions where the other two lateral link means are connected with the wheel carrying means, the said positions being so located that a cornering force acting point on the rear wheel is between imaginary lines passing through the first mentioned position and respective ones of the second mentioned positions. With this arrangement, it is possible to decrease the axial forces on the lateral link means under a cornering force. Preferably, the first mentioned position is located above the rotation axis of the rear wheel and the second mentioned positions are located below the rotation axis. The aforementioned other two link means are preferably arranged so that projections in a horizontal plane of extensions of their longitudinal axes intersect each other outward said rear wheel. This particular arrangement is effective to produce a toe-in movement of the rear wheel under a braking force.

In a specific feature of the present invention, the second lateral link means is connected to the wheel carrying means at a position above the rotation axis of the rear wheel, the first lateral link means being connected at a position below and forward of the rotation axis and the third lateral link means being connected at a position below and rearward of the rotation axis, the second lateral link means being shorter than the third lateral link means. This arrangement is effective to suppress toe-out movements of the rear wheel under upward bumping and downward rebouncing of the rear wheel. The first lateral link means is preferably connected to the wheel carrying means forward a line passing through the cornering force acting point on the rear wheel and the position where the second lateral link is connected to the wheel carrying means, the third lateral link means being connected to the wheel carrying means rearward of the aforementioned line, the distance between the position of connection of the second lateral link means and the aforementioned line being smaller than that between the position of connection of the third lateral link means and the aforementioned line. The arrangement is effective to produce a toe-in movement of the rear wheel under an inwardly directed side force.

In a further mode of the present invention, the second and third link means are arranged rearward of the first link means, the second link means being above and shorter than the third lateral link means, projections in a vertical transverse plane of the longitudinal axes of the second and third lateral link means intersecting each other at a point inward of the rear wheel, the first link means being shorter than the second and third link means.

The above and other objects and features of the present invention will become apparent from the following descriptions of preferred embodiments taking reference to the accompanying drawings, in which.

Figure 7:
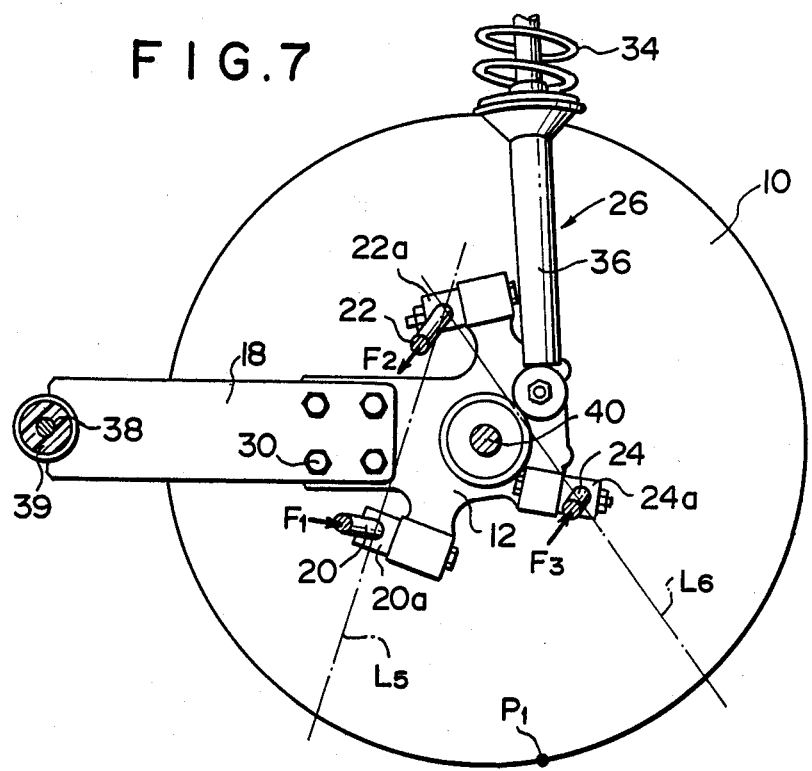
Figure 6A:
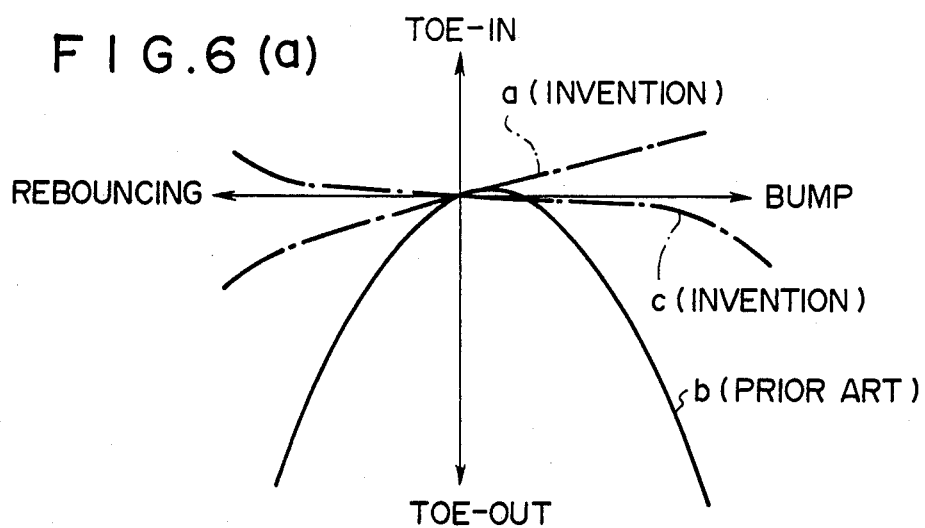
Figure 8:
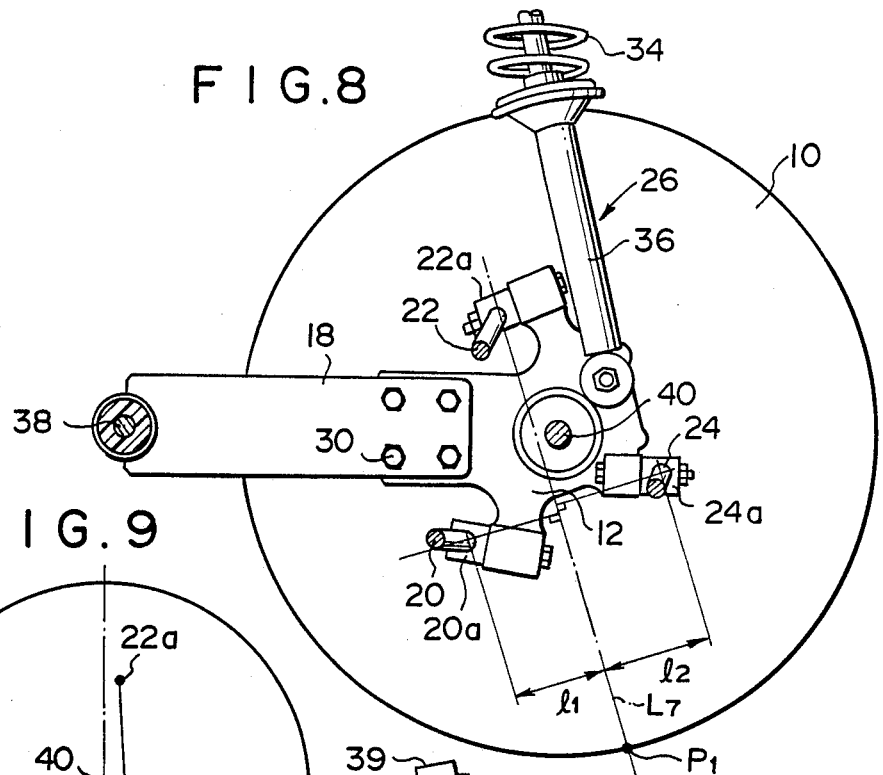
Figure 9:
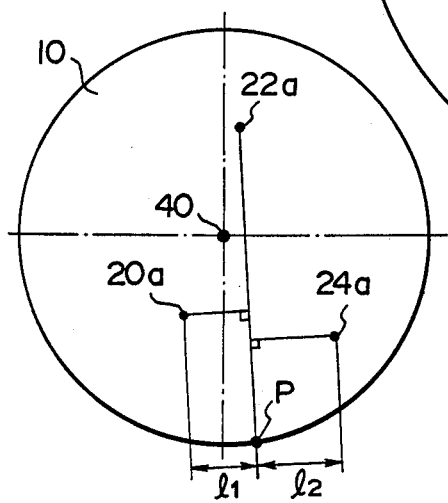
Figure 10:
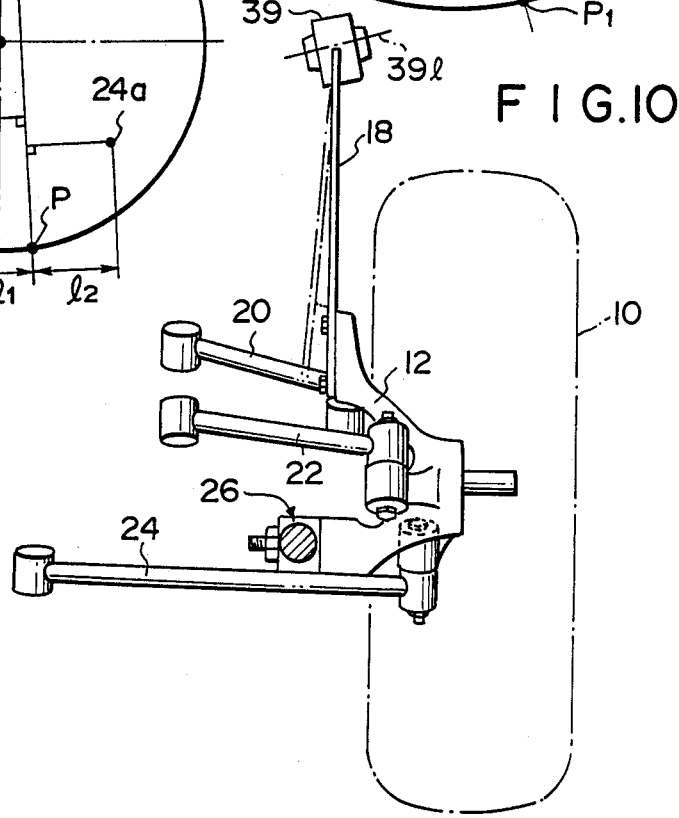

FIGS. 6(a), (b), (c) are diagrams showing, respectively, changes in the toe-angle, the camber angle and the tread in the rear wheel under upward bumping and rebouncing movements;

FIG. 7 is a side view as seen from inside of a suspension system in accordance with another embodiment;

FIG. 8 is a side view similar to FIG. 7 but showing a further embodiment;

FIG. 9 is a diagrammatical illustration of a further embodiment of the present invention; and, FIG. 10 is a top plan view of a rear suspension mechanism showing a further embodiment.

Figure 1:
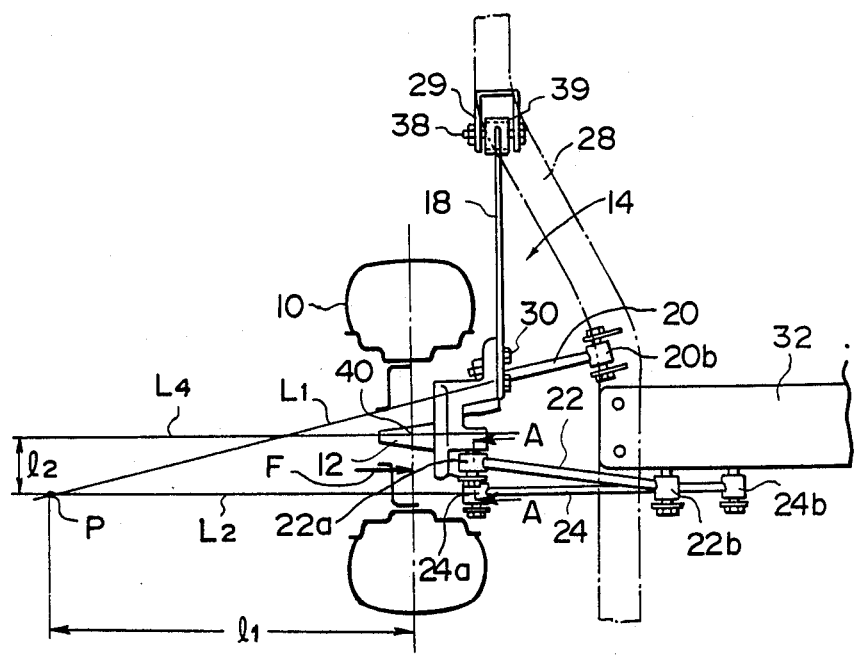
FIG. 1 is a diagrammatical top plan view of a rear suspension system in accordance with one embodiment of the present invention.
Figure 2:
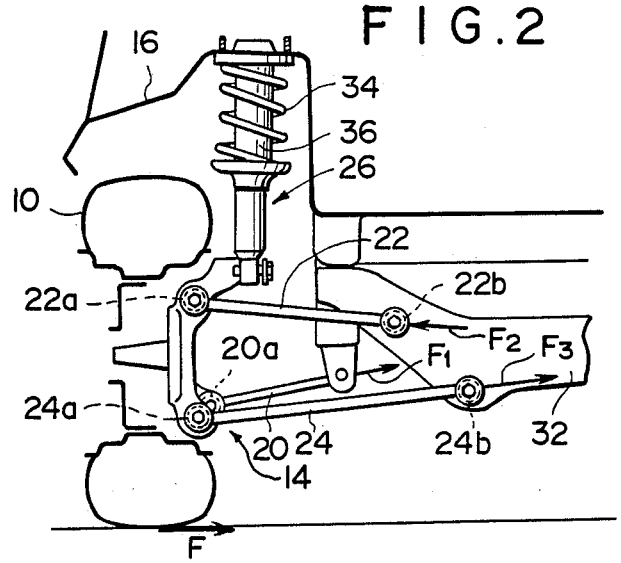
FIG. 2 is a rear view of the suspension system.
Figure 3:
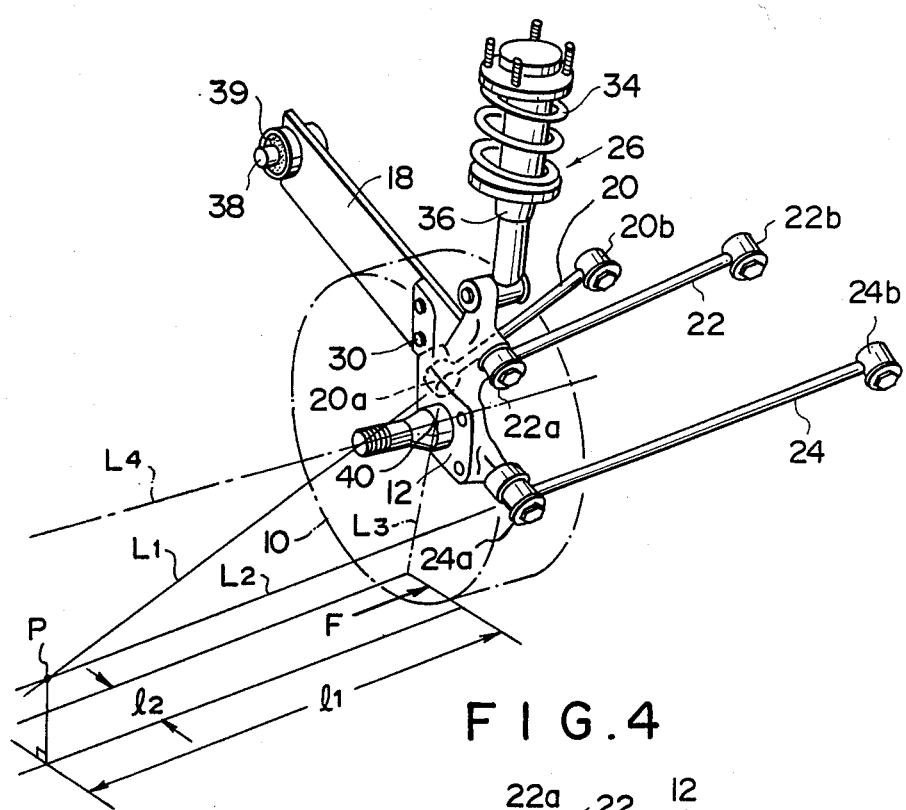
FIG. 3 is a perspective view of the suspension system.

Referring now to the drawings, particularly to FIGS. 1 through 3, there is shown a vehicle rear left wheel 10 which is carried by a wheel carrying member 12 for rotation about a rotation axis L4. Between the wheel carrying member 12 and a vehicle body 16, there is a rear suspension system 14 which includes a longitudinally extending swing arm 18. The swing arm 18 is connected at the front end with a bracket 29 provided on a frame 28 of the vehicle body 16 by means of a rubber bushing 39 and a laterally extending pin 38 so that the arm 18 is vertically swingable about a horizontal axis. The rear end of the swing arm 18 is secured to the wheel carrying member 12 by means of bolts 30.

Figure 4:
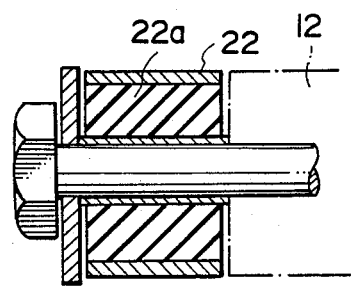
FIG. 4 is a sectional view of a rubber bushing for connecting the lateral link to the wheel carrying member.

The suspension system 14 further includes a first lateral link 20, a second lateral link 22 and a third lateral link 24. The first lateral link 20 extends substantially transversely with respect to the vehicle body 16 and has a transverse outward end connected with the wheel carrying member 12 through a rubber bushing 20a for swinging movement about a substantially longitudinal axis. The transverse inward end of the first lateral link 20 is connected with the body frame 28 through a rubber bushing 20b for swinging movement about a substantially longitudinal axis. The second and third lateral links 22 and 24 are connected at one ends respectively through rubber bushings 22a and 24a to the wheel carrying member 12 for swinging movements about substantially longitudinal axes, and at the other ends respectively through rubber bushings 22b and 24b to a rear sub-frame 32 of the vehicle body 16 for swinging movements about substantially longitudinal axes. In FIG. 4, there is shown the rubber bushing 22a as a typical example of the aforementioned rubber bushings. It should be noted that the other bushings have similar structures.

Between the wheel carrying member 12 and the vehicle body 16, there is disposed a substantially vertically extending strut assembly 26 which comprises a coil spring 34 and an oleo damper 36. The strut assembly 26 is pivotably connected at the lower end with the wheel carrying member 12 and connected at the upper end to the vehicle body 16 so as to allow a certain degree of angular movement.

In FIG. 3, it will be noted that the second lateral link 22 is connected to the wheel carrying member 12 at a position above and rearward of the wheel center 40 and the first lateral link 20 is connected at a position below and forward of the wheel center 40. The third lateral link 24 is connected to the wheel carrying member 12 at a position below and rearward of the wheel center 40. As shown in FIGS. 1 and 3, the first lateral link 20 is inclined rearward and downward and has a length shorter than those of the other two lateral links 22 and 24. The second lateral link 22 is inclined slightly forward and upward whereas the third lateral link 24 is inclined slightly downward. The first lateral link 20 has a longitudinal axis L1 and the third lateral link 24 has a longitudinal axis L2, the axes L1 and L2 intersecting each other at a point P which is laterally outwardly spaced from a vertical line L3 passing through the wheel center 40 by a distance l1 and longitudinally rearwardly spaced from the wheel rotation axis L4 by a distance l2. It will further be noted that projections of the axes of the second and third lateral links 22 and 24 on a transverse vertical plane intersect each other at a point inward of the wheel 10. Further, the first lateral link 20 is shorter in length that the third lateral link 24.

Figure 6B:
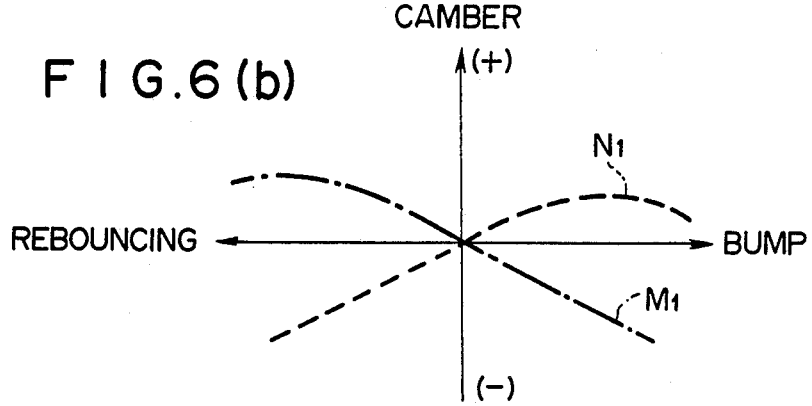
Figure 6C:
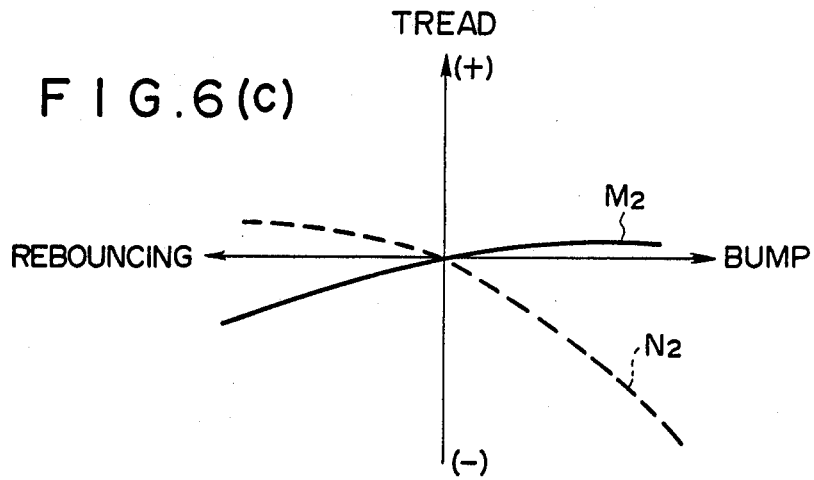

As the wheel 10 is bumped in a vertical direction, the swing arm 18 is swung about the pin 38 so that the wheel center 40 is moved along an arcuate path having a center of arc at the axis of the pin 38. The wheel carrying member 12 is laterally supported by the three lateral links 20, 22 and 24 which also swing in vertical directions to produce lateral displacements at the outward ends. In the embodiment shown in FIGS. 1 through 3, when the wheel 10 is upwardly bumped, the laterally outward end of the first lateral link 20 is slightly displaced outward but the displacement is small because the link 20 is inclined rearward. The outer end of the second lateral link 22 is displaced inward in response to an upward bump of the wheel. Further, the outer end of the third lateral link 24 is displaced outward, the distance of displacement being larger than that of the outer end of the first lateral link 20. Since the outer ends of the first and second lateral links 20 and 22 are located forward of the outer end of the third lateral link 24, there is produced a slight toe-in movement. Further, there is produced a decrease in the camber angle. Under a downward rebouncing of the wheel, there are produced a slight toe-out movement and a slight increase in the camber angle. Speaking more specifically, the toe-angle of the wheel is changed as shown by a curve a in FIG. 6(a). The toe-angle change in the prior art suspension system of the laid-open Japanese utility model No. 56-62205 is shown by a curve b in FIG. 6(a). Thus, the advantage of the present invention will be apparent from this diagram. Where the third lateral link 24 has a length sufficiently large as compared with the first lateral link 20, there will be no noticeable displacement in the outer end of the third lateral link 24 so that the toe-angle change will be as shown by a curve c. It will be understood that the camber angle is changed as shown by a curve $M_1$ in FIG. 6(b) due to the arrangements of the second and third lateral links 22 and 24 as described previously. As the wheel bumps upward, the wheel carrying member 12 is displaced inward and there may be produced a decrease in tread between the rear wheels. However, in the arrangement described above, the camber angle is decreased in response to an upward bumping of the wheel and the decrease in the camber angle causes an increase in the tread. As a result, the tread changes as shown by a curve $M_2$ in FIG. 6(c). Where the second and third lateral links 22 and 24 are inclined so that projections of their axes on a transverse vertical plane intersect outward of the wheel 10, the camber angle will change as shown by a curve $N_1$ in FIG. 6(b). Then, the tread will change as shown by a curve $N_2$ in FIG. 6(c). Since the swing arm 18 is of a cross-sectional configuration which provides a certain degree of deflection in the lateral direction of the vehicle body, the swing arm 18 is laterally deflected as necessary as the wheel carrying member 12 is displaced as described above. Further, the rubber bushing 39 permits a certain amount of lateral displacement of the swing arm.

Figure 5:
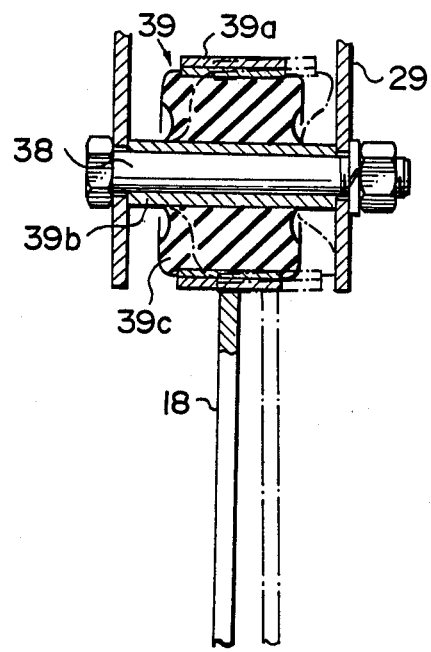
FIG. 5 is a sectional view of the rubber bushing for connecting the swing arm to the vehicle body.

Referring to FIG. 5, it will be noted that the rubber bushing 39 includes an outer tube 39a and an inner tube 39b. A resilient rubber 39c is disposed between and adhered to the outer and inner tubes 39a and 39b. The pin 38 is inserted into the inner tube 39b to secure the inner tube 39b to the bracket 29 of the frame 28. The outer tube 39a is welded to the swing arm 18. It will be understood in FIG. 5 that the rubber bushing 39 is deflected as shown by phantom lines to permit a lateral displacement of the swing arm 18.

When a braking force is applied to the wheel 10, the rubber bush 39 is deformed to allow a slight rearward displacement of the swing arm 18. Thus, there will be produced in the wheel carrying member 12 a turning displacement about the point P of intersection of the lines $L_1$ and $L_2$. Therefore, a slight toe-in displacement is produced in the rear wheel 10. When a forwardly directed traction force is applied to the wheel 10, there may be produced a toe-out displacement in the wheel 10. However, such a toe-out displacement can be prevented by providing the rubber bush 39 with a stopper (not shown) which restricts forward deflection of the rubber bush 39.

When a side force or a cornering force F is applied to the rear wheel 10 as shown in FIGS. 1 and 3, there will be produced a slight toe-in displacement due to reaction forces applied from the lateral links 20, 22 and 24 to the wheel carrying member 12 since the side force acting point on the wheel 10 is forward of the point P of intersection of the lines $L_1$ and $L_2$. Thus, steering stability is ensured in operation through curved paths. It is also possible to obtain a slight toe-in displacement under an inwardly directed side force and a slight toe-out displacement under an outwardly directed side force by appropriately determining the lateral rigidity of the rubber bushings 20a, 22a and 24a connecting the lateral links 20, 22 and 24 to the wheel carrying member 12.

Referring now to FIG. 7, the embodiment shown therein is different from the previous embodiment in that the second lateral link 22 is connected to the wheel carrying member 12 at a location above and forward of the wheel center 40. In either of the previously described arrangements, it is possible to substantially equalize the axial forces produced in the lateral links 20, 22 and 24 under a side force F. In FIG. 7, considering the balance of moments about a line $L_5$ passing through centers of the rubber bushings 20a and 22a, the moment produced by the side force F acting on a point $P_1$ is balanced by the moment produced by an axial compression force $F_3$ in the third lateral link 24. Similarly, considering the balance of moments about a line $L_6$ passing through centers of the rubber bushings 22a and 24a, a moment produced by the side force F is balanced by the moment produced by an axial compression force $F_1$ in the first lateral link 20. In order to counterbalance these axial compression forces $F_1$ and $F_3$, there will be produced an axial tensile force $F_2$ in the second lateral link 22, the sum of the forces $F_1$ and $F_3$ being substantially equal to the sum of the force $F_2$ and the side force F.

FIG. 8 shows another embodiment of the present invention in which corresponding parts are designated by the same reference numerals. Referring to FIG. 8, there is drawn an imaginary line $L_7$ which passes through the center of the rubber bushing 22a and the side force acting point $P_1$ on the wheel 10. In this embodiment, the distance l1 between the center of the rubber bushing 20a and the imaginary line $L_7$ is smaller than the distance 12 between the center of the rubber bushing 24a and the imaginary line $L_7$. In this arrangement, the axial compression force $F_1$ produced in the first lateral link 20 under the side force F becomes greater than the axial compression force $F_3$ in the third lateral link 24. Such difference in the axial forces $F_1$ and $F_3$ produces a difference in deformation of the rubber bushings 20a and 24a and causes a slight toe-in movement of the wheel 10. FIG. 9 shows a modification of the arrangement of FIG. 8 and a similar toe-in movement of the wheel 10 is produced under a side force F.

Referring now to FIG. 10, the embodiment shown therein is different from the previously described embodiments in that the rubber bushing 39 for connecting the front end of the swing arm 18 has an axis 39l which is inwardly and rearwardly inclined with respect to a transverse direction of the vehicle body. With this arrangement, when the wheel 10 is bumped, the swing arm 18 is deflected inward as shown by phantom lines to permit inward displacement of the wheel carrying member 12. At the same time, an axial deformation is produced in the rubber bush 39 causing a slight rearward displacement of the swing arm 18 and therefore a corresponding rearward displacement of the wheel carrying member 12. As the result, there will be producing a slight toe-in movement as described with reference to FIG. 1.

The invention has been shown and described with reference to specific embodiments, however, it should be noted that the invention is in no way limited to the details of the illustrated structures but changes and modifications may be made without departing from the scope of the appended claims.

We claim:

1. In a vehicle rear suspension system for a rear wheel of a vehicle including a wheel carrier having a rotational axis for a wheel, a swing arm pivoted at one end to the vehicle through a resilient bushing, and lateral links each connected at an inward end to the vehicle and at an outward end to the wheel carrier, the improvement comprising a toe angle control means for controlling the toe angle of the wheel, said toe angle control means comprised of a pair of the lateral links horizontally spaced apart, a camber angle control means for controlling the camber angle of the wheel, said camber angle control means comprised of one of the pair of lateral links comprising the toe angle control means and a third lateral link, single pivot means for pivotally connecting one end of said third lateral link to the vehicle and the other end of the third lateral link located above the pair of lateral links, said first, second and third lateral links being connected to the wheel carrier at points displaced from the rotational axis, and connection means for connecting the other end of the swing arm to the wheel carrier providing one of a pivotal connection about a vertical axis and a connection allowing lateral relative displacement, said connection means preventing relative rotation between the other end of the swing arm and the wheel carrier about a horizontal axis.

2. In a vehicle rear suspension system according to claim 1 wherein one of said pair of lateral links is located below and forwardly of said rotational axis and the other of said pair of lateral links is located below and rearwardly of said rotational axis.

3. In a vehicle rear suspension system according to claim 2 wherein said third lateral link is located above and rearwardly of said rotational axis.

4. In a vehicle rear suspension system according to claim 2 wherein said third lateral link is located above and forwardly of said rotational axis.

5. In a vehicle rear suspension system according to claim 2 wherein said one of said pair of lateral links is shorter than the other.

6. In a vehicle rear suspension system according to claim 5 wherein said other of said pair of lateral links is longer than said third lateral link.

7. In a vehicle rear suspension system according to claim 6 wherein said one of said pair of lateral links is shorter than said third lateral link.

8. In a vehicle rear suspension system according to claim 1 wherein said third lateral link is inclined outwardly slightly forwardly and upwardly.

9. In a vehicle rear suspension system according to claim 2 wherein said one of said pair of lateral links is inclined rearwardly and downwardly.

10. In a vehicle rear suspension system according to claim 9 wherein said other of said pair of lateral links is inclined outwardly slightly downwardly.

11. In a vehicle rear suspension system according to claim 1 wherein the projection of the axes of the pair of lateral links intersect outwardly and rearwardly of the wheel carrier.

12. In a vehicle rear suspension system according to claim 2 wherein the axes of said third lateral link and said other of said pair of lateral links cross inwardly of the wheel carrier.

13. In a vehicle rear suspension system according to claim 2 wherein each lateral link is connected by a resilient bushing to the wheel carrier and the distance from the bushing connecting said one of said pair of lateral links to a line extending between the bushing connecting said third lateral link and the cornering force acting point on a wheel mounted on the wheel carrier is shorter than the distance from the bushing connecting the other of said pair of lateral links to the line.

14. In a vehicle rear suspension system according to claim 3 wherein each lateral link is connected by a resilient bushing to the wheel carrier and the distance from the bushing connecting said one of said pair of lateral links to a line extending between the bushing connecting said third lateral link and the cornering force acting point on a wheel mounted on the wheel carrier is shorter than the distance from the bushing connecting the other of said pair of lateral links to the line.

15. In a vehicle rear suspension system according to claim 4 wherein each lateral link is connected by a resilient bushing to the wheel carrier and the distance from the bushing connecting said one of said pair of lateral links to a line extending between the bushing connecting said third lateral link and the cornering force acting point on a wheel mounted on the wheel carrier is shorter than the distance from the bushing connecting the other of said pair of lateral links to the line.

16. In a vehicle rear suspension system according to claim 1 wherein the connection means is a pivotal connection about a vertical axis.

17. In a vehicle rear suspension system according to claim 2 wherein the connection means is a pivotal connection about a vertical axis.

18. In a vehicle rear suspension system according to claim 1 wherein the connection means is a connection allowing lateral relative displacement.

19. In a vehicle rear suspension system according to claim 2 wherein the connection means is a connection allowing lateral relative displacement.

20. In a vehicle rear suspension system according to claim 18 wherein the connection means comprises the swing arm having a cross-sectional configuration providing for lateral deflection and being rigidly connected to the wheel carrier to allow the wheel carrier to be laterally relatively displaced.

21. In a vehicle rear suspension system according to claim 19 wherein the connection means comprises the swing arm having a cross-sectional configuration providing for lateral deflection and being rigidly connected to the wheel carrier to allow the wheel carrier to be laterally relatively displaced.

22. In a vehicle rear suspension system according to claim 20 wherein the swing arm is bolted to the wheel carrier.

23. In a vehicle rear suspension system according to claim 21 wherein the swing arm is bolted to the wheel carrier.

24. In a vehicle rear suspension system according to claim 1 wherein the connection means is comprised of the swing arm being rigidly attached to the wheel carrier in combination with the swing arm being configured to allow said lateral relative displacement.

25. In a vehicle rear suspension system according to claim 1 wherein the connection means is comprised of the swing arm being rigidly attached to the wheel carrier and the swing arm being arranged to allow said lateral relative displacement.

26. In a vehicle rear suspension system according to claim 1 the further improvement of a strut pivotally connected at one end to the wheel carrier and connected at the other end to the vehicle.

27. In a vehicle rear suspension according to claim 26 wherein the strut comprises an oleo damper and a coil spring.

28. In a vehicle rear suspension system according to claim 1 wherein the resilient bushing is inclined inwardly and rearwardly.

29. In a vehicle rear suspension system according to claim 2 wherein the resilient bushing is inclined inwardly and rearwardly.

* * * * *